US005856021A

United States Patent [19]

Missell

[11] Patent Number: 5,856,021

[45] Date of Patent: Jan. 5, 1999

[54] TONER-RECEPTIVE MEDIA FOR DIGITAL OFFSET PRINTING

[75] Inventor: Gregory E. Missell, Penfield, N.Y.

[73] Assignee: Eastman Kodak Company, Rochester, N.Y.

[21] Appl. No.: 796,485

[22] Filed: Feb. 6, 1997

[51] Int. Cl.[6] ................................ B32B 9/02; B05D 1/38

[52] U.S. Cl. ....................... 428/478.2; 428/336; 428/337; 428/211; 428/411.1; 428/473.5; 428/474.4; 428/476.6; 428/478.8; 428/479.6; 346/135.1; 427/372.2; 427/384; 427/391; 427/395; 427/411

[58] Field of Search ................................. 428/211, 411.1, 428/435, 474.4, 476.6, 478.2, 332, 334, 337, 336, 473.5, 478.8, 479.6; 427/212, 372.2, 384, 391, 395, 411; 346/135.1; 162/135, 137

[56] References Cited

U.S. PATENT DOCUMENTS

| | | | |
|---|---|---|---|
| 3,864,158 | 2/1975 | Timmerman et al. . | |
| 4,220,471 | 9/1980 | Date et al. | 430/532 |
| 5,068,140 | 11/1991 | Malhotra et al. | 428/216 |
| 5,202,205 | 4/1993 | Malhota | 430/17 |
| 5,302,249 | 4/1994 | Malhotra et al. | 162/135 |
| 5,624,743 | 4/1997 | Malhotra | 428/216 |

FOREIGN PATENT DOCUMENTS

| | | |
|---|---|---|
| 0 546 750 A1 | 6/1993 | European Pat. Off. . |
| 0 637 603 A1 | 2/1995 | European Pat. Off. . |
| 734 882 A2 | 10/1996 | European Pat. Off. . |
| 2 212 741 | 8/1989 | United Kingdom . |
| 90/16016 | 12/1990 | WIPO . |
| WO 96/06384 | 2/1996 | WIPO . |

*Primary Examiner*—Marie R. Yamnitzky
*Attorney, Agent, or Firm*—John R. Everett

[57] ABSTRACT

The toner image receiver sheet of the invention, which is useful for digital offset printing, comprises a resin-coated paper substrate on which is formed an image-receiving layer comprising an imino-functionalized polymer and a gelatin. In a process for making the receiver sheet, a composition, preferably an aqueous solution containing the imino-functionalized polymer and gelatin, is applied to a resin-coated surface of a paper substrate, thereby forming an image-receiving layer on the substrate. The image-receiving layer provides the receiver sheet with a glossy, non-tacky surface having excellent toner transfer and adhesion characteristics.

19 Claims, No Drawings

TONER-RECEPTIVE MEDIA FOR DIGITAL OFFSET PRINTING

FIELD OF THE INVENTION

This invention relates to toner-receptive media for use in digital offset color printing. More specifically, this invention relates to a glossy receiver sheet for receiving images of electrically charged toners using a digital offset color printing press.

BACKGROUND OF THE INVENTION

Currently available receiver media for digital offset printing presses consist of a variety of papers and films having a clay coating or clay base. The papers have a very low gloss, with only the film-based receivers exhibiting glossy surfaces.

In a digital offset printing press, the toner "link" is not absorbed into the substrate but rather resides on the surface of the media. The problem of adhesion and transfer at this toner-media interface, especially on a high gloss surface, requires that the media have a special surface treatment to promote total toner transfer and adhesion to the surface.

One type of surface treatment of paper known in the prior art does not produce a distinct layer on the paper, but rather causes the surface to become basic or alkaline. Such a process is not applicable to glossy films or resin-coated papers because it would reduce gloss, make the surface very tacky to the touch, degrade ink transfer and adhesion, and cause paper feeding and paper stacking problems resulting from the tacky surface.

PCT International Application WO 96/06384 discloses a printing method to form an image of colored toner polymer particles on a paper substrate whose surface has been treated with a compound having a basic functionality, preferably a polymeric imine. The method is purported to improve image adhesion on many but not all of the papers tested.

European Patent Application EP 0 637 603 Al discloses a polymeric film substrate coated with a polyamido-polyethyleneimine. Although the primary purpose of the applied coating is to render the coated film receptive to direct extrusion overcoating with other polymers, improved ink adhesion is also recited as an object.

UK Patent Application GB 2 212 741 A discloses a polyolefin film coated with an aqueous solution of a modified polyethylenimine compound. The coated film is intended for use as a receiver for UV-curable inks.

There is a continuing need for a receiver sheet for images from digital offset printing presses that has a glossy surface with excellent toner transfer and adhesion properties. The present invention meets this need.

SUMMARY OF THE INVENTION

The present invention provides glossy, toner-receptive media comprising a resin-coated paper for the transfer and adhesion of an "ink" comprising pigmented toner particles in a carrier of hydrocarbon liquids. The receiver sheet of the invention has a non-tacky surface and yields high quality images with good transfer and excellent adhesion.

The toner image receiver sheet of the invention, which is useful for digital offset printing, comprises a resin coated paper substrate on which is disposed an image-receiving layer comprising an imino-functionalized polymer and a gelatin.

Further in accordance with the invention is a process for making the toner image receiver sheet by applying a composition, preferably an aqueous solution, comprising the imino-functionalized polymer and gelatin to a resin-coated surface of a paper substrate, thereby forming an image-receiving layer on the substrate.

The image-receiving layer provides the receiver sheet of the invention with a glossy, non-tacky surface that exhibits excellent toner transfer and adhesion characteristics.

DETAILED DESCRIPTION OF INVENTION

In a digital offset printing process, a latent image is projected digitally to a drum and, using an electrostatic process, is "inked" with electrically charged liquid toner particles. The resulting toner image is transferred to a blanket drum using electrostatic and pressure forces, where it is heated to form a thin polymer film. This film is then transferred directly to the image-receiving layer on the substrate. A digital offset color press especially suitable for use with the receiver sheet of the present invention is the Indigo E-Print 1000 press from Indigo N.V.

The liquid toner composition comprises a hydrocarbon carrier liquid such as Isopar™ L and M with pigmented toner particles, as described in the aforementioned PCT W096/06384, the disclosure of which is incorporated herein by reference.

Preferred substrates are resin-coated papers ranging in thickness from about 5 mils (125 g) to 10 mils (250 g). The resin may be, for example, polyethylene, polypropylene, polyesters, or mixtures thereof, applied on either or both sides of the paper by any methods known in the art such as, for example, solvent coating, melt extrusion, or lamination.

An image-receiving layer (IRL) of the invention is applied to a coated side of the substrate by any of the known coating arts. The IRL, which preferably is applied to the substrate using an aqueous solution of the IRL constituents, has a dry thickness of, preferably, about 0.5 $\mu$ to 20 $\mu$, more preferably, about 1 $\mu$ to 7 $\mu$. The IRL comprises a blend of a polymer having an imino functionality and a gelatin and preferably exhibits a basic pH, more preferably about 9 to 11.

In preferred embodiments, the imino-functionalized polymer includes the moiety -NH-, at least a portion of which may be alkylated by, for example, ethylene oxide, yielding an N-hydroxyethylsubstituted material. Preferred polyimines include, for example, polyethylenimine (50% water solution), polyethylenimine (80% ethoxylated), and polyethylenimine, epichlorohydrin modified, all available from Aldrich Chemical Co. Alternatively, other polymeric materials having a imino functionality may be employed.

Preferred gelatins are a mixture of proteins obtained by hydrolysis of collagen from animal skin, bones, etc., for example, Gelatin-40 and Gelatin-32, both lime-processed bone gelatins, and Gelatin-5, an acid-processed gelatin from pig skin, all manufactured by Eastman Kodak. Preferred ratios of gelatin:polyimine are from about 60:40 to 90:10, the preferred ratio being about 70:30.

The following examples further illustrate the invention:

EXAMPLE 1

Preparation of receiver sheets

The following procedure is exemplary: To a 10 weight percent aqueous solution of a mixture of Gelatin-40 and polyethylenimine (80% ethoxylated) in a 70:30 weight ratio was added 0.05 weight percent of Olin 10G surfactant. The resulting solution was coated on a corona discharge-treated, resin-coated (single side) paper of 7.5-mil (190-$\mu$) thickness at a dry coverage of 0.40 g/ft$^2$.

Similar receiver sheets in accordance with the invention were prepared by substantially the same procedure and with the same IRL component weight ratio, substituting 9.25-mil (230-$\mu$) thick resin-coated paper, Gelatin-32, and Gelatin-5 as appropriate.

Control coatings that included the gelatin component but omitted the polyimine were also prepared. A coating in which polyethylenimine was present but the gelatin component was omitted was also prepared, but it could not be tested because of its extremely tacky surface. Also included as a control for gloss measurements was a commercial clay-coated paper, Lustro Indigo Gloss Cover, manufactured by Warren Co., whose surface treatment was similar to that described in PCT WO 96/06384. The constitution of the prepared control coatings and receiver sheets of the invention are given in TABLE 1.

TABLE 1

| Receiver Sheet | IRL Components | Substrate Thickness | Toner Transfer | Toner Adhesion |
|---|---|---|---|---|
| Invention | | | | |
| 1 | Gelatin-40/EPEI | 7 5 mil | Excellent | Excellent |
| 2 | Gelatin-40/EPEI | 9.25 mil | Excellent | Excellent |
| 3 | Gelatin-32/EPEI | 7.50 mil | Excellent | Excellent |
| 4 | Gelatin-32/EPEI | 9.25 mil | Excellent | Excellent |
| 5 | Gelatin-5/EPEI | 7.5 mil | Excellent | Excellent |
| 6 | Gelatin-5/EPEI | 9.25 mil | Excellent | Excellent |
| Control | | | | |
| 7 | Gelatin-40 | 7.5 mil | Poor | Poor |
| 8 | Gelatin-32 | 7.5 mil | Poor | Poor |
| 9 | Gelatin-5 | 7.5 mil | Poor | Poor |
| 10 | Gelatin-40 | 9.25 mil | Poor | Poor |
| 11 | Gelatin-32 | 9.25 mil | Poor | Poor |
| 12 | Gelatin-5 | 9.25 mil | Poor | Poor |

EPEI - Polyethylenimine (80% ethoxylated)

EXAMPLE 2

Evaluation of toner transfer from the blanket to the IRLs

The evaluation of toner transfer from the blanket drum of an Indigo E-Print 1000 press to an IRL was based on the detection of toner remaining on the blanket surface following transfer. The blanket surface was wiped with a clean cloth wetted with Isopar™ L hydrocarbon liquid. The cloth was then examined to see whether it had picked up any untransferred toner. The qualitative results, summarized in TABLE 1, show that substantially complete transfer had occurred with receiver sheets 1–6 of the invention, essentially no toner being detectable on the cloth. However control receiver sheets 7–12, whose image receiving layers included only the gelatin component, exhibited poor toner transfer, based on the large amounts of toner observed on the cloth in each instance.

As previously mentioned, a control sheet whose image-receiving layer contained only polyethylenimine, had an extremely tacky surface, which precluded evaluation of its toner transfer and adhesion properties.

EXAMPLE 3

Evaluation of toner adhesion to the IRLs

A test of toner adhesion to the IRL surfaces consisted of applying by hand 3M Scotch™ magic tape over the imaged area immediately after printing. The tape was then pulled off the IRL surface to see whether any of the toner image was removed in the process. The qualitative results, also summarized in TABLE 1, show that excellent toner adhesion, i.e., no image removal, was observed with sheets 1–6 of the invention, while control receivers 7–12 showed poor adhesion, i.e. substantial image removal under the test conditions.

Example 4

Gloss measurements of the IRLs

Gloss measurements were measured with a Gardener Micro TRI gloss meter, model 4520, at a setting of 60 degrees. The measurements were taken in the background, or D-min, areas of the imaged IRLs. The results, summarized in TABLE 2, show that receiver sheets 1–6 of the invention yielded gloss values in the 80s, while the Lustro clay-coated control receiver had a gloss of only 29.

TABLE 2

| Receiver Sheet | IRL Components | Substrate Thickness | 60 Degree Gloss |
|---|---|---|---|
| Invention | | | |
| 1 | Gelatin-40/EPEI | 7.5 mil | 87 |
| 2 | Gelatin-40/EPEI | 9.25 mil | 88 |
| 3 | Gelatin-32/EPEI | 7.5 mii | 84 |
| 4 | Gelatin-32/EPEI | 9.25 mil | 86 |
| 5 | Gelatin-5/EPEI | 7.5 mil | 89 |
| 6 | Gelatin-5/EPEI | 9.25 mil | 88 |
| Control | | | |
| | Lustro clay-coated | 7.5 mil | 29 |

EPEI - Polyethylenimine (80% ethoxylated)

The invention has been described in detail with particular reference to preferred embodiments thereof, but it will be understood that variations and modifications can be effected within the spirit and scope of the invention.

What is claimed is:

1. A toner image receiver sheet comprising:

a resin-coated paper substrate; and an image-receiving layer comprising an imino-functionalized polymer and a gelatin disposed on the resin-coated surface of said substrate; wherein the weight ratio of gelatin:imino-functionalized polymer is about 60:40 to 90:10.

2. The receiver sheet of claim 1 wherein said substrate has a thickness of about 125 $\mu$ to 250 $\mu$.

3. The receiver sheet of claim 1 wherein said image-receiving layer has a dry thickness of about 0.5 $\mu$ to 20 $\mu$.

4. The receiver sheet of claim 3 wherein said image-receiving layer has a dry thickness of about 1 $\mu$ to 7 $\mu$.

5. The receiver sheet of claim 1 wherein said imino-functionalized polymer comprises a polyethylenimine material.

6. The receiver sheet of claim 5 wherein said polyethylenimine material comprises an ethoxylated polyethylenimine.

7. The receiver sheet of claim 5 wherein said polyethylenimine material comprises an epichlorohydrin modified polyethylenimine.

8. The receiver sheet of claim 1 wherein said gelatin comprises a lime-processed bone gelatin.

9. The receiver sheet of claim 1 wherein said gelatin comprises an acid-processed gelatin.

10. The receiver sheet of claim 1 wherein the weight ratio of gelatin:imino-functionalized polymer is about 70:30.

11. The receiver sheet of claim 1 having a 60 degree gloss value of at least 80 in an image D-min area.

12. A process for forming a toner image receiver sheet, said process comprising:

providing a resin-coated paper substrate; and applying to the resin-coated surface of said substrate a composition comprising an imino-functionalized polymer and a gelatin; wherein the weight ratio of gelatin:imino-functionalized polymer is about 60:40 to 90:10, thereby forming on said substrate an image-receiving layer.

13. The process of claim 12 wherein said substrate has a thickness of about 125 $\mu$ to 250 $\mu$.

14. The process of claim 12 wherein said composition for forming said image-receiving layer comprises an aqueous solution containing said imino-functionalized polymer and said gelatin.

15. The process of claim 14 wherein said image-receiving layer has a dry thickness of about 0.5 $\mu$ to 20 $\mu$.

16. The process of claim 12 wherein said imino-functionalized polymer comprises a polyethylenimine material.

17. The process of claim 16 wherein said polyethylenimine material is an ethoxylated polyethylenimine or an epichlorohydrin modified polyethylenimine.

18. The process of claim 12 wherein said gelatin is a lime-processed bone gelatin or an acid-processed gelatin.

19. The process of claim 12 wherein the weight ratio of gelatin:imino-functionalized polymer is about 70:30.

* * * * *